United States Patent [19]

Hikosaka et al.

[11] Patent Number: 4,585,553
[45] Date of Patent: Apr. 29, 1986

[54] APPARATUS FOR THE REMOVAL OF SOLID PARTICLES FROM PRINTING INK OR OTHER LIQUIDS

[75] Inventors: Shinichi Hikosaka, Tokyo; Shinya Fujino, Kawagoe; Takao Fukaya, Tokyo, all of Japan

[73] Assignee: Dai Nippon Insatsu Kabushiki Kaisha, Japan

[21] Appl. No.: 553,968

[22] Filed: Nov. 21, 1983

[30] Foreign Application Priority Data

| Nov. 24, 1982 | [JP] | Japan | 57-205870 |
| Nov. 24, 1982 | [JP] | Japan | 57-177552[U] |
| Dec. 21, 1982 | [JP] | Japan | 57-192231[U] |
| May 6, 1983 | [JP] | Japan | 58-67494[U] |
| Sep. 13, 1983 | [JP] | Japan | 58-141859[U] |

[51] Int. Cl.$^4$ .................. B01D 25/26; B01D 35/06
[52] U.S. Cl. .................... 210/107; 210/111; 210/223; 210/306; 210/357; 210/396; 210/415
[58] Field of Search ............. 210/106, 143, 222, 223, 210/235, 107, 111, 413, 414, 415, 305, 306, 357, 396

[56] References Cited

U.S. PATENT DOCUMENTS

| 1,468,906 | 9/1923 | Inman | 210/306 |
| 1,673,743 | 6/1928 | Fulcher et al. | 210/413 |
| 1,747,149 | 4/1929 | Cuno | 210/107 |
| 1,987,597 | 1/1935 | Cuno et al. | 210/107 |
| 2,029,611 | 2/1936 | Chewning | 210/305 |
| 2,405,137 | 8/1946 | Gale et al. | 210/222 |
| 2,553,567 | 5/1951 | Fette | 210/414 |
| 2,760,638 | 8/1956 | Arnett et al. | 210/222 |
| 2,959,288 | 11/1960 | Fowler | 210/222 |
| 3,830,621 | 8/1974 | Miller | 210/222 |
| 4,018,886 | 4/1977 | Giaever | 210/222 |
| 4,147,633 | 4/1979 | Kato | 210/232 |
| 4,357,812 | 11/1982 | Braga et al. | 210/305 |
| 4,367,143 | 1/1983 | Carpenter | 210/222 |
| 4,472,275 | 9/1984 | Yano | 210/223 |
| 4,474,890 | 10/1984 | Rieger | 435/316 |
| 4,519,906 | 5/1985 | Hikosaka et al. | 210/223 |
| 4,529,517 | 7/1985 | Bertil | 210/223 |

FOREIGN PATENT DOCUMENTS

| 146521 | 3/1950 | Australia | 210/174 |
| 1017102 | 10/1957 | Fed. Rep. of Germany | 210/222 |
| 1115603 | 8/1961 | Fed. Rep. of Germany | |
| 296333 | 2/1954 | Switzerland | 210/413 |
| 557214 | 11/1943 | United Kingdom | 210/223 |

OTHER PUBLICATIONS

"Magnetic Separation: A Review of Principles, Devices, and Applications", Oberteuffer, The Institute of Electrical and Engineers, Inc., Jun. 1974, pp. 223-238.

Primary Examiner—Barry S. Richman
Assistant Examiner—Titus B. Ledbetter, Jr.
Attorney, Agent, or Firm—Parkhurst & Oliff

[57] ABSTRACT

Apparatus particularly useful for the removal of iron particles and other magnetic solids from printing ink. Included is a casing (22) through which flows a liquid to be clarified. A plurality of straight bar magnets (M), mounted to the inside surface of a tubular sheath (50), are magnetically attached to the outer surface of the casing for creating magnetic fields within the casing. The magnetic solids contained in the liquid are magnetically attracted to the inside surface of the casing and so are separated from the liquid. The detachment of the magnets from the casing causes the separated solids to settle to the bottom of the casing for easy discharge through a drain port (38) formed therein. A cartridge filter (28) is provided centrally within the casing for the separation of nonmagnetic solids from the liquid.

11 Claims, 20 Drawing Figures

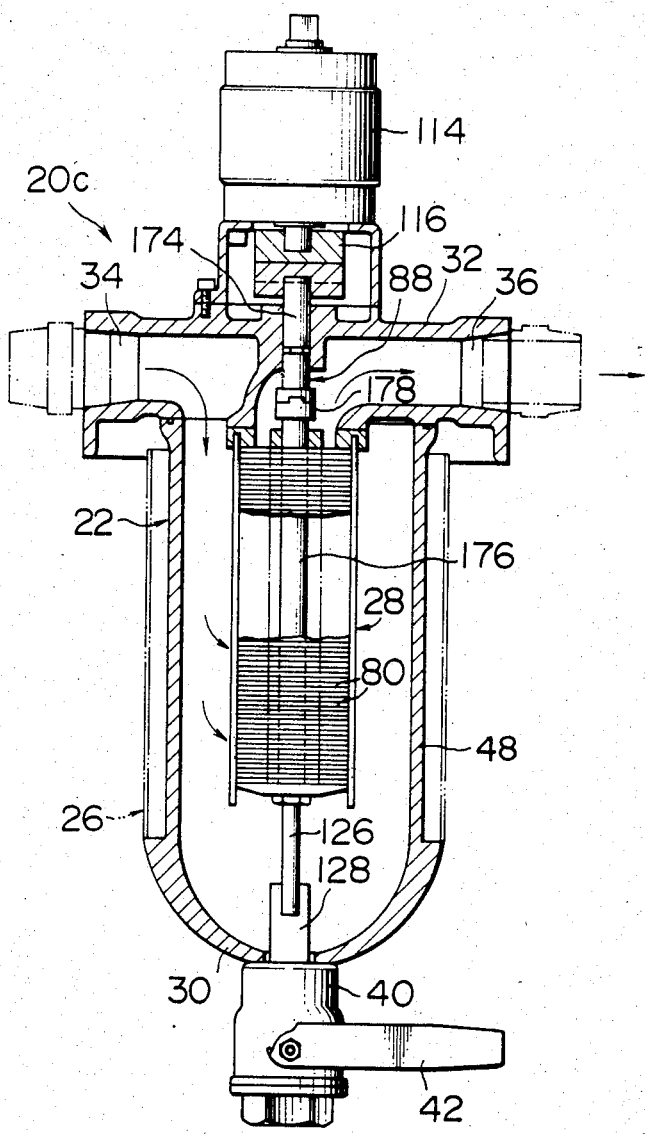

APPARATUS FOR THE REMOVAL OF SOLID PARTICLES FROM PRINTING INK OR OTHER LIQUIDS

BACKGROUND OF THE INVENTION

This invention relates to apparatus for the separation of solid matter from a liquid by magnetic attraction or by both magnetic attraction and filtration. The solid-liquid separation apparatus in accordance with the invention has particular utility in conjunction with the clarification of printing ink; nonetheless, it lends itself to the processing of petroleums, organic solvents, paints, dyes, etc., and to water purification as well.

Let us consider gravure printing as an illustration of the need for the removal of solid particles from printing ink. In gravure printing the image area is etched, engraved or otherwise created below the surface of the printing plate or cylinder in the form of tiny "cells" or depressions. The printing surface is flooded with ink and then wiped or scraped clean of excess ink by a steel blade, called a doctor, leaving the ink contained in the cells below the surface. The ink is transferred from the cells to the paper pressed against the surface.

If the gravure printing ink contains solid matter, it will become caught between the printing surface and the doctor and so interfere with the thorough scraping of excess ink off the printing surface. The solids will also cause the rapid or uneven wear or damage of both the printing surface and the doctor, materially shortening their service life. The worn or damaged printing surface and doctor can impair the quality of the reproductions and even produce defective prints that must be discarded. These results greatly increase the manual labor of removing the foreign matter from between the printing surface and the doctor, reconditioning or replacing the printing surface and doctor, and inspecting the produced prints for defective ones. The consequent increase in printing cost is also a problem.

Further the solid matter contained in printing ink may seriously affect the equipment through which the ink flows or recirculates. An example of such equipment is an automatic viscosity control provided for the ink reservoir forming a part of the closed path for ink recirculation. The viscosity control has a rotor for sensing ink viscosity from the resistance offered by the ink to its rotation. The rotor is received with clearance in a tubular sheath, and the ink flows through the narrow clearance space therebetween. Should any coarse solid be caught between the rotor and its sheath, the viscosity control would react as if the ink viscosity had increased.

A complete removal of solid particles from gravure printing ink is the only possible solution to the foregoing problems. A variety of solid-liquid filters or separators have been suggested and used in the printing industry. Typical of these are meshed or screen filters, roll-up filters, cartridge filters, and a combination of a screen filter and magnetic means. All these prior art devices have one drawback or another.

Screen filters rapidly deteriorate in their filtration ability with the clogging of the pores. They must therefore be backwashed periodically to clean them of accumulated solids, with the filtering operation suspended. Roll-up filters are susceptible to rupture due to the liquid pressure. Being not reusable, moreover, they are expensive and also require a break in the filtering operation for the replacement of the used rolls.

Known apparatus comprising both a screen filter and magnetic means for solid-liquid separation is also subject to several objections. One of these concerns the arrangement of the magnetic means with respect to the flow path of the liquid. As all the liquid does not pass sufficiently close to the magnetic means, the magnetic matter contained in the liquid is not removed therefrom to a desired degree. Additionally the screen filter for combined use with the magnetic means has its own disadvantages set forth previously.

Cartridge filters are commercially available with facilities for cleaning the cartridge without interruption of filtering. The cartridge consists of a stack of flat wheel shaped discs, arranged alternately with spacers to provide spaces between the discs for filtration. Fixed alongside the stack of discs is a comb or a set of stationary cleaner blades which extend into the spaces between the discs. When the cartridge is turned through a complete revolution, the solids are combed out of the spaces between the discs by the cleaner blades.

Although the cartridge filters can be reconditioned as above without interruption of filtration, they are limited in the size of particles that can be filtered off, and so are unable to capture fine iron or other metal particles which do much harm in gravure printing. Another disadvantage is that the cartridge is easy to clog up unless it is cleaned at intervals determined in accordance with the actual flow rate of the liquid therethrough, rather than periodically, particularly in cases where the liquid contains a large proportion of solids.

A further drawback of the conventional cartridge filter arises from the fact that the stack of discs is turned in one and the same direction for scraping off the solids by the cleaner blades. The unidirectional rotation of the discs causes the solids to attach only to and accumulate on one side of each cleaner blade, resulting in rapid deterioration of the cleaning ability of the cleaner blades. The use of a high speed electric motor for the revolution of the disc stack in accordance with the prior art is also objectionable as it necessitates the combined use of a speed reducer; the complete motor drive unit has been too bulky and expensive.

A still further objection to the conventional cartridge filter is that the cleaner blades are mounted in fixed relation to the stack of discs, usually with some clearances between the cleaner blades and the peripheries of the spacers which are also in the form of apertured discs smaller in diameter than the filter discs. In the presence of such clearances the cleaner blades can remove coarse or rigid solids but not paper fibers which abound in printing ink. Sticking fast to the discs, the paper fibers cannot possibly be combed off unless the cleaner blades are pressed firmly against the discs.

Scraped off the cartridge, the solids settle to the bottom of the housing accommodating the cartridge. They can normally be discharged by opening a drain port at the bottom of the housing. However, if the amount of solids is unusually large, as after a prolonged period of filtering operation, the drain port has been easy to clog as the accumulated solids stick together, making it impossible to discharge them. The prior art cartridge filter has had no provisions for preventing such clogging of the drain port.

SUMMARY OF THE INVENTION

The present invention overcomes the noted difficulties of the prior art and provides improved apparatus capable of removing solid particles from a liquid at least by magnetic attraction. The invention also provides apparatus for solid-liquid separation by both magnetic attraction and filtration.

Stated in its simplest form, the solid-liquid separation apparatus in accordance with the invention comprises a casing having an inlet for the admission of the liquid to be processed and an outlet for the discharge of the processed liquid. Magnet means are mounted on the outside of the casing for attracting magnetic solids contained in the liquid while the same is flowing through the casing from the inlet to the outlet.

Gravure printing ink in particular contains a large proportion of iron particles or like magnetic solids. The removal of such magnetic solids from printing ink is essential for obviating the difficulties pointed out previously. The above summarized apparatus can effectively remove the magnetic particles, no matter how fine they may be, by causing the same to be magnetically attached to the inside surface of the casing. The magnet means may comprise either permanent magnets or electromagnets.

One of the advantages of the magnetic solid-liquid separation apparatus in accordance with the invention is the ease with which the removed solids can be withdrawn from within the casing. To this end the magnetic fields that have been created within the casing by the magnet means may simply be eliminated as by removing the permanent magnets from the outside of the casing or by deenergizing the electromagnets. The solids will then fall to the bottom of the casing, from which they can be discharged by opening a drain port.

As the magnet means are disposed externally of the casing, the inside surface of the casing, which preferably takes the form of an upstanding cylinder with a bowl shaped bottom, can be made smooth. Magnetically attached to this smooth inside surface of the casing, the solids will readily fall to its bottom, for discharge through the drain port positioned centrally therein, upon removal of the magnetic fields. The cleaning of the casing interior will also be easy. It is also an advantage that the external magnet means allow easy assemblage and disassemblage of the apparatus.

For the separation of nonmagnetic solids from the liquid, the apparatus may additionally comprise a generally cylindrical filter assembly mounted concentrically within the casing. The liquid can be freed from nonmagnetic solids as it flows into the filter assembly on its way from the inlet to the outlet. A particularly preferable filter assembly for combined use with the magnet means is a cartridge filter refined in accordance with the invention.

The cartridge filter is preferably provided with at least two separate stacks of stationary cleaner blades spaced from each other in the circumferential direction of the stack of filter discs. An actuator is coupled to the filter discs for bidirectionally turning the same about their own axis through an angle up to 360 degrees in each direction. The two sets of cleaner blades can clean the bidirectionally revolving filter discs more effectively than does the conventional single set of cleaner blades with the unidirectionally revolving filter discs. Furthermore, as the direction of rotation of the filter discs is reversed, the solids that have stuck to one side of each cleaner blade will readily loosen and separate therefrom. A further advantage is that since the filter discs are revolved through an angle not more than 360 degrees in each direction, the complete peripheral edges of the filter discs can be uniformly cleaned in a short period of time.

As the actuator there may be employed a hydraulic or pneumatic motor or other types of actuating mechanisms. A pneumatic rotary actuator of bidirectional design, herein disclosed in detail, is particularly desirable in the processing of printing ink. For, not only can it develop sufficient torque for the reconditioning of the filter cartridge, but also the printing press is usually equipped with air piping to the advantage of the pneumatic actuator. Its energy requirement is appreciably less than the pneumatic motor.

It is recommended to automate the cleaning of the filter cartridge by the bidirectional rotary actuator, as in a preferred embodiment disclosed herein. Adopted toward this end is a sensor for sensing the flow rate of the processed liquid downstream of the filter. A valve is activated by the output from the sensor for setting the actuator into operation whenever the filter cartridge is in need of cleaning The sensor may be either an ultrasonic flowmeter, a float or spring type flowmeter, or an instrument capable of measuring the pressure differential across the filter. The sensor may activate the valve when the flow rate of the processed liquid drops to a predetermined minimum required for the operation of the printing press or any other machine that consumes or otherwise uses the liquid. The automatic cleaning of the filter at intervals depending upon the actual flow rate of the clarified liquid, rather than at regular intervals, is particularly advantageous in applications where the liquid recirculates through a closed path because the concentration of solids in the liquid usually increases with the lapse of time in the filter chamber and so necessitates the cleaning of the filter at progressively shorter intervals.

The invention also features provisions for springing the cleaner blades into sliding engagement with the peripheries of respective spacer discs interposed between the filter discs. Experiment has proved that, thus held against the spacer discs, the cleaner blades can more efficiently remove solids, including fibrous matter, from between the filter discs than if gaps exist therebetween as in the prior art.

A further feature of the invention resides in agitator means located at or adjacent the drain port of the casing. Depending from the stack of filter discs, the agitator means revolves therewith, at the time of their cleaning, for agitating and loosening the solids that have settled to the bottom of the casing and, possibly, have stuck together. Such agitation of the accumulated solids greatly expedites their discharge through the drain port. It will be appreciated that no particular power source is required for the agitator means other than the actuator for the reconditioning of the filter. The agitator means operates automatically and concurrently with filter reconditioning. In practice the agitator means may comprise one or more plate members which may be either flat or in the shape of screw propeller blades.

The above and other features and advantages of the present invention and the manner of realizing them will become more apparent, and the invention itself will best be understood, from a study of the following description and appended claims taken together with the attached drawings showing some preferable embodiments of the invention.

BRIEF DESCRIPTION OF THE DRAWINGS

FIG. 20 is a view similar to FIG. 2 but showing a slight modification of the apparatus.

DETAILED DESCRIPTION OF THE INVENTION

Figure 1:
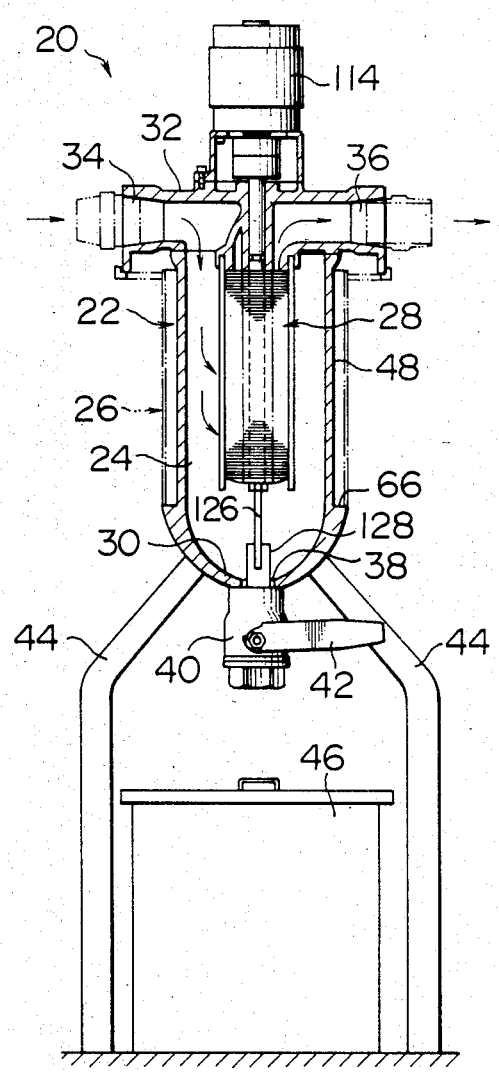
FIG. 1 is an elevation, partly in vertical section, through the solid-liquid separation apparatus constructed in accordance with the novel concepts of this invention.

The solid-liquid separation apparatus in accordance with the invention is shown in its entirety in FIG. 1 as adapted specifically for the clarification of gravure printing ink. Generally designated 20, the exemplifying apparatus broadly comprises:

1. a casing 22 defining a liquid chamber 24 for receiving the liquid to be processed;
2. a magnet assembly, depicted by the phantom outline designated 26 in FIG. 1, surrounding the casing 22 for the removal of magnetic solids from the liquid in the liquid chamber 24; and
3. a generally cylindrical filter assembly 28 disposed centrally in the liquid chamber 24 for the removal of primarily nonmagnetic solids from the liquid.

The casing 22 takes the form of an upstanding cylinder having a bowl shaped bottom 30 formed integral therewith and a removable top 32. The casing 22 may be made of aluminum or other metal. The removable top 32 of the casing has formed therein an inlet 34 for the introduction of the liquid to be processed into the liquid chamber 24 and an outlet 36 for the withdrawal of the processed liquid therefrom. The concave bottom 30 of the casing has a drain port 38 defined centrally therein for draining the liquid together with the accumulated solids. The drain port 38 is openably closed by a cock 40 with a handle 42.

The casing 22 stands on legs 44 astraddle a drain receptacle 46. This receptacle lies just below the drain cock 40 for receiving the drain from the casing 22.

Figure 2:
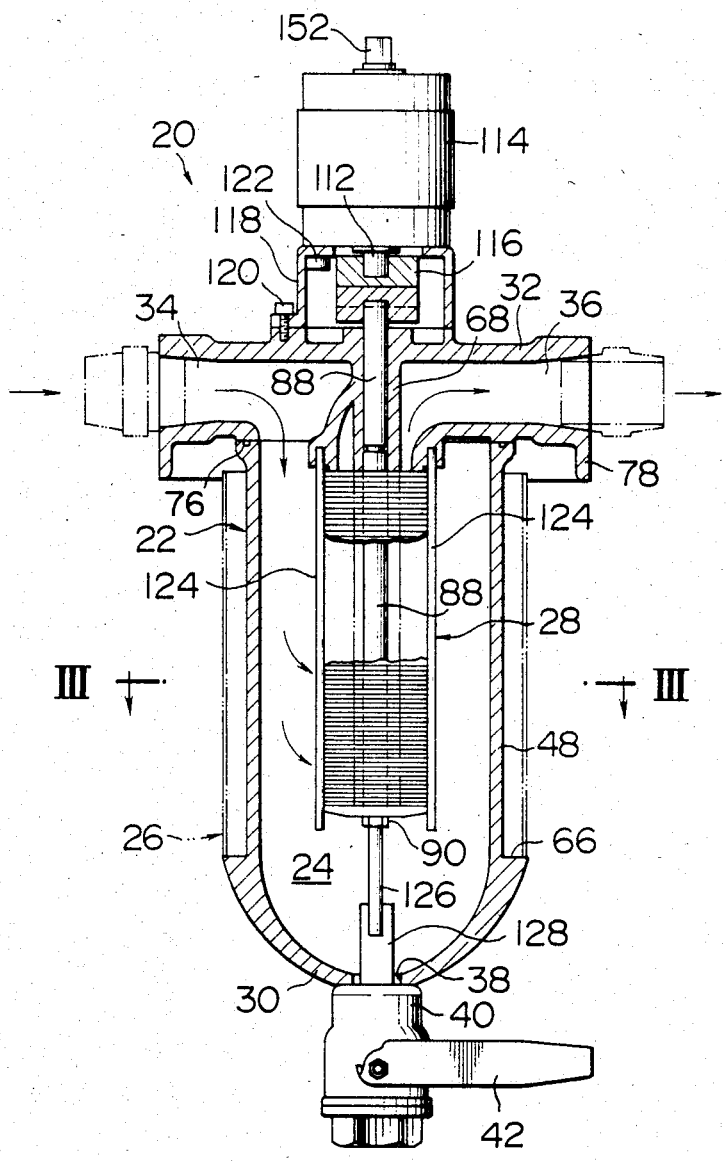
FIG. 2 is an elevation partly in enlarged vertical section through the essential parts of the solid-liquid separation apparatus of FIG. 1.

FIG. 2 is an enlarged representation of the solid-liquid separation apparatus 20 except for the legs 44 and drain receptacle 46. It will be noted from this figure that the filter assembly 28 is disposed concentrically within the casing 22, depending from the removable top 32 of the casing and terminating short of its bottom 30. An approximately tubular space is defined between casing 22 and filter assembly 28. As will be later described in more detail, the filter assembly 28 has an exterior in direct communication with the inlet 34 and an interior in direct communication with the outlet 36, so that the liquid is filtered while flowing into the filter assembly.

The magnet assembly 26 completely encircles the major cylindrical portion 48 of the casing 22. The details of the magnet assembly 26 will become apparent from the following discussion of FIGS. 3, 4 and 5.

Figure 3:
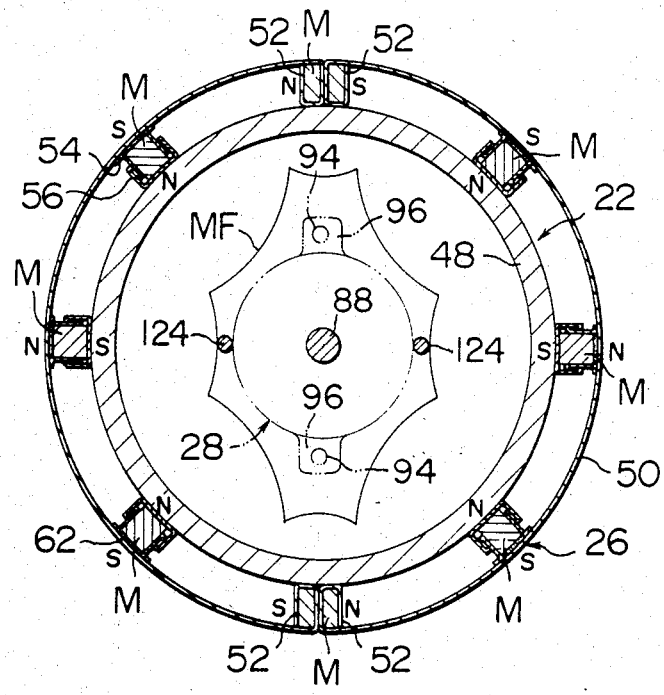
FIG. 3 is an enlarged horizontal section through the solid-liquid separation apparatus, taken along the line III—III of FIG. 2 and showing in particular the magnet means mounted externally of the casing for removing magnetic solids from the liquid.
Figure 4:
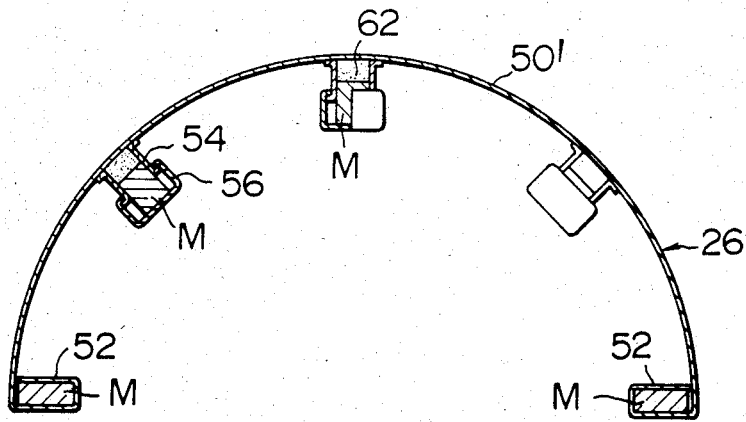
FIG. 4 is a more enlarged horizontal section through a half of the magnet means of FIG. 3 as detached from the casing.

As best seen in FIG. 3, the magnet assembly 26 in this particular embodiment comprises a plurality of permanent magnets M mounted to the inside surface of a tubular sheath 50 sleeved upon the major portion 48 of the casing 22 with clearance. The permanent magnets M are herein shown as straight bars of ferrite material, arranged parallel to the axis of the casing 22 and at constant spacings in its circumferential direction. The sheath 50 is split longitudinally into a pair of halves, one of which is shown in FIG. 4 and therein designated 50'. Each sheath half 50' carries a specific number of, five in the illustrated embodiment, straight bar magnets M. The opposite side edges of each sheath half 50' are folded inwardly at 52 so as to envelop the two terminal magnets M, so that these terminal magnets are nondisplaceable with respect to the sheath. All the other magnets M are elastically displaceable radially of the sheath 50 within limits.

Figure 5:
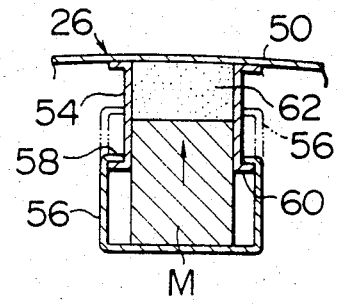
FIG. 5 is a still more enlarged, fragmentary horizontal section through the magnet means, showing the way each magnet is supported.

FIG. 5 illustrates the way each of the other magnets M is mounted on the sheath 50 for elastic displacement in its radial direction. The sheath 50 has a pair of opposed radial guide walls 54 formed rigidly on its inside surface for slidably receiving part of each magnet M. A channel shaped retainer 56, having a pair of flanges 58 engageable with a pair of flanges 60 of the guide walls 54, prevents the detachment of the magnet M from between the guide walls. Sponge or like elastic material is interposed at 62 between the sheath 50 and each magnet M, biasing the latter radially inwardly of the sheath, with the retainer 56 held in the solid line position of FIG. 5. When the retainer 56 is forced radially outwardly to the phantom position, the magnet M also travels therewith against the bias of the elastic material 62.

When the magnet assembly 26 is mounted in position around the casing 22 as in FIG. 3, the magnets M at the opposite side edges of each sheath half 50' attract the neighboring magnets at the opposed side edges of the other sheath half, the polarities of these terminal magnets being so predetermined as in this figure. The other magnets M become pressed radially outwardly of the sheath 50 by the casing 22 and so compress the elastic material 62. The compressed elastic material urges the magnets M against the casing 22 via the retainers 56.

It will also be noted from FIG. 3 that the north (N) and south (S) seeking poles of the magnets M are substantially alternately oriented radially inwardly of the casing 22. Thus arranged, the magnets M create the net magnetic fields, designated MF, in the liquid chamber 24 within the casing 22. It should be noted that the net magnetic fields MF do not reach the filter assembly 28.

When six permanent magnets each with a surface magnetic intensity of 700 to 800 gausses, available commercially, are mounted to the outer surface of the casing 22, the net magnetic fields created thereby will reach 40 millimeters from the magnets. It has been ascertained by experiment that such magnets can sufficiently attract iron particles and like magnetic solids from the printing ink, with a viscosity of 50 centipoises and a specific gravity of one, flowing through the liquid chamber 24 at a velocity of 20 centimeters per second.

Figure 7:
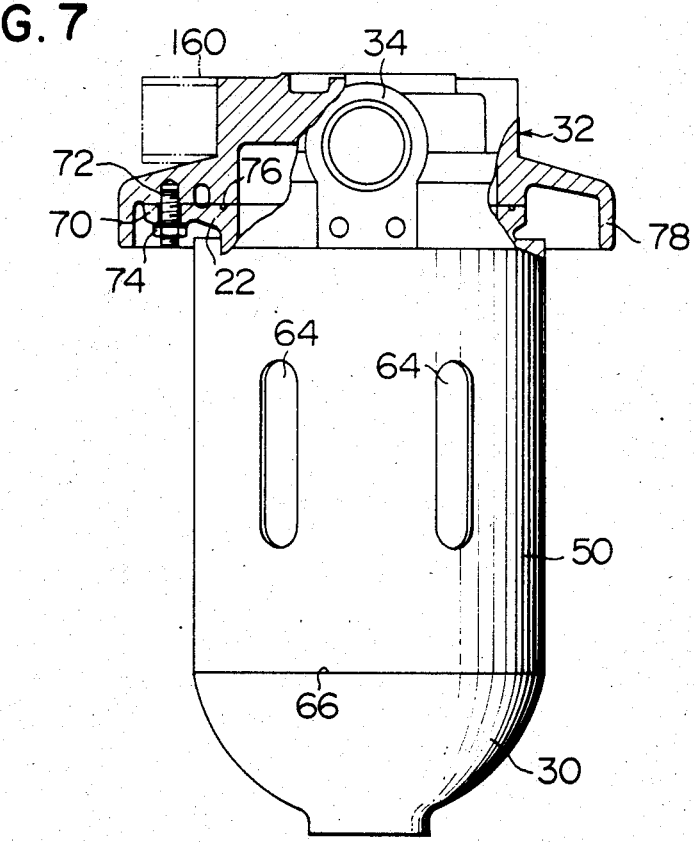
FIG. 7 is a partial side elevation, with parts broken away and shown in section for clarity, of the apparatus of FIGS. 1 and 2.

Preferably, and as shown in FIG. 7, the sheath 50 of the magnet assembly 26 should be provided with a pair of hand slots 64 in each half 50' for the ease of mounting to and dismounting from the casing 22. FIGS. 1, 2 and 7 indicates that the casing 22 has an annular shoulder 66 just above its bowl shaped bottom 30 to allow the magnet assembly 26 to rest thereon.

Figure 6:
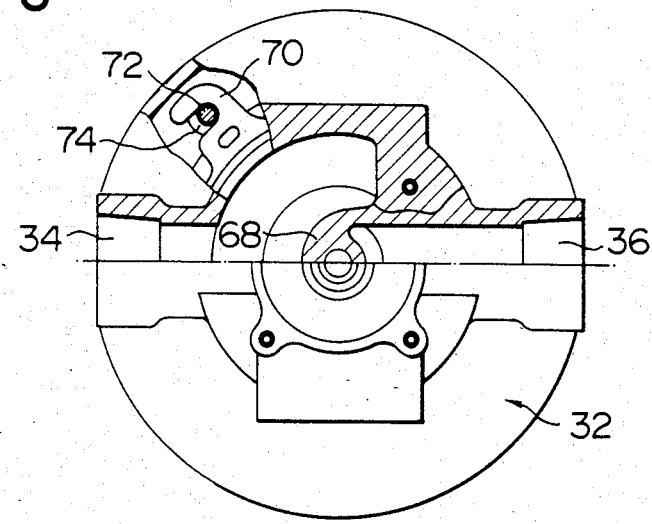
FIG. 6 is a top plan, with parts in section and parts broken away for clarity, of the apparatus of FIGS. 1 and 2.

With reference to FIGS. 2, 6 and 7 the removable top 32 of the casing 22 is shaped to provide the inlet 34 and outlet 36 which both communicate with the liquid chamber 24 and which intercommunicate via the filter assembly 28. A sleeve 68 is formed centrally of the removable top 32 for purposes yet to be described.

FIGS. 6 and 7 further reveal the means for separably coupling together the casing 22 and the top 32. The casing 22 has a plurality of hooklike arms 70 projecting radially outwardly from its top end. Headless bolts 72 extend through the recesses in the arms 70 and are threadedly engaged in the top 32. Nuts 74 are fitted over the bolts 72, just under the arms 70, and are tightened against the arms. Thus the top 32 is positively secured to the casing 22. The hooklike shape of the arms 70 is intended to expedite the removal of the top 32 from the casing 22. The top 32 is readily removable by turning the same a small angle relative to the casing 22 after loosening the nuts 74 on the bolts 72. An annular seal is provided at 76, (FIGS. 2 and 7) for fluid tightly sealing the joint between the casing 22 and its top 32.

It will also be observed in FIGS. 2 and 7 that the removable top 32 has an annular skirt 78 depending from its periphery. This skirt is intended to prevent the printing ink from splashing onto the bolts 72 and nuts 74. The splashing of the ink to, and subsequent drying on, these parts might make the nuts 74 unloosenable.

The filter assembly 28 takes the form of a cartridge filter in this particular embodiment. Although the cartridge filter appears in FIGS. 1, 2 and 3, FIGS. 8 and 9 better illustrate that it comprises a multiplicity of apertured filter discs 80 stacked up concentrically and alternately with apertured spacer discs 82. Both filter discs 80 and spacer discs 82 are wheellike in shape, but the filter discs are greater in diameter than the spacer discs. The filter discs 80 and spacer discs 82 have their hubs 84 and 86 fitted over a core rod 88, rotatably supported by the depending sleeve 68 of the removable casing top 32, for joint rotation therewith. A nut 90, (FIG. 2) is threadedly mounted on the core rod 88 to hold the stack of filter and spacer discs in position thereon. The spacer discs 82 serve to provide minute gaps between the rims 92 of the filter discs 80. As indicated by the arrows in FIG. 9, the printing ink passes through these gaps between the filter discs 80 into the interior of the filter cartridge and so leaves the foreign solids, mostly nonmagnetic, trapped between the discs. The filtrate flows upwardly toward the outlet 36 through the spaces between the spokes 91 and 93 of the filter and spacer discs 80 and 82.

It will have been seen that the thickness of the spacer discs 82 determines the degree of filtration. The spacer discs should not be too thin as the cartridge would then become susceptible to destruction due to fluid pressure and also would become costly. Of course, should the spacer discs be too thick, the cartrdige would pass objectionably large solids. The degree of filtration to be offered by the cartridge filter depends upon the intended application of the apparatus. For the clarification of printing ink, for example, the gaps between the filter discs should be in the range from 25 to 150 microns, preferably from 50 to 100 microns.

Figure 8:
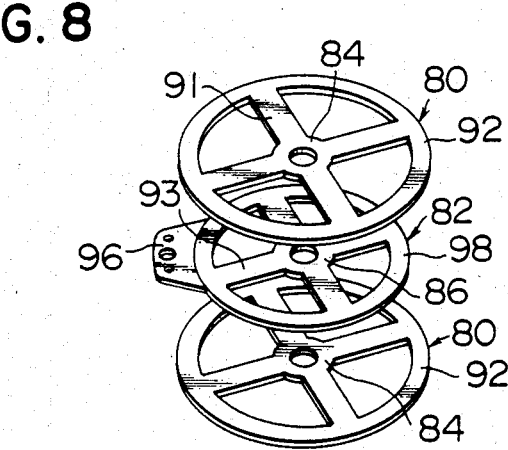
FIG. 8 is an exploded perspective view of some essential parts of the cartridge filter used in the apparatus of FIGS. 1 and 2.
Figure 9:
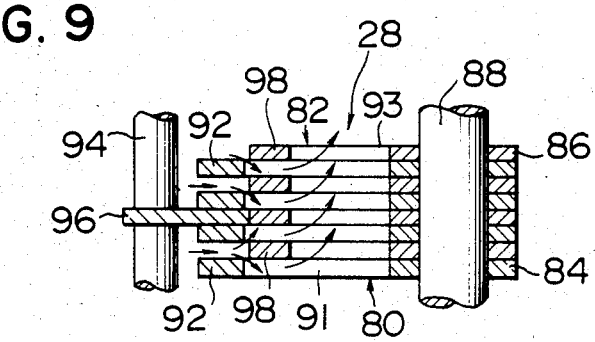
FIG. 9 is an enlarged, fragmentary axial section through the cartridge filter.
Figure 10:
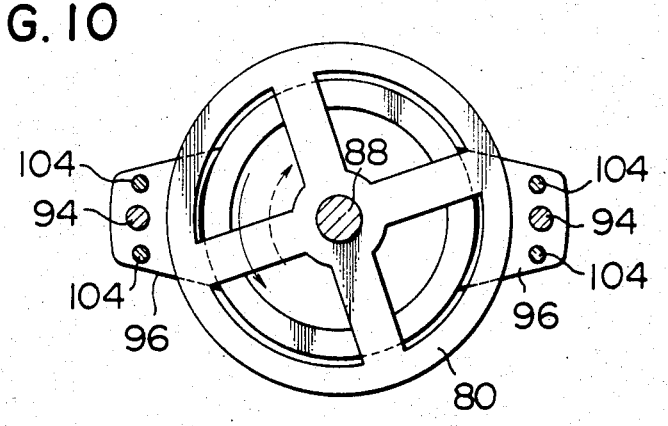
FIG. 10 is a plan of the cartridge filter, showing in particular the arrangement of the two sets of cleaner blades with respect to the stack of filter and spacer discs.

Fixed alongside the stack of filter and spacer discs 80 and 82 is at least one, preferably two, support rods 94 mounted in fixed relation to the casing 22 and each holding a set of stationary cleaner blades 96 slidably engaged between the rims 92 of the filter discs 80. FIGS. 8 and 9 show only one such cleaner blade 96 for illustrative convenience only. FIGS. 3 and 10 clearly indicate that the preferred two sets of cleaner blades 96 are disposed in diametrically opposite positions of the filter discs 80. Upon rotation of the filter discs 80 with the core rod 88, all the solids that have been arrested between the discs are combed out by the two sets of cleaner blades 96.

Figure 11:
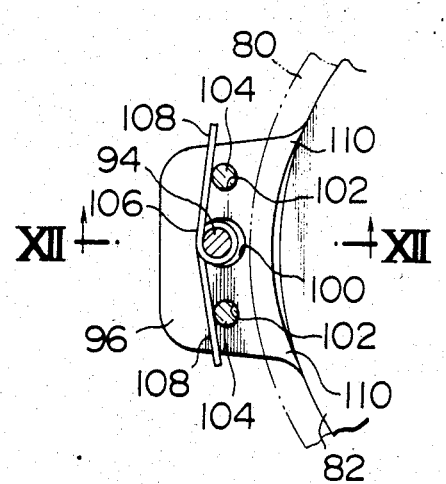
FIG. 11 is an enlarged fragmentary plan of the cartridge filter, showing in particular the means for biasing the cleaner blades into sliding engagement with the peripheries of the respective spacer discs.
Figure 12:
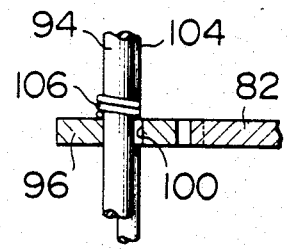
FIG. 12 is a fragmentary horizontal section through the cartridge filter, taken along the line XII—XII of FIG. 11.

For the efficient cleaning of the filter cartridge, the cleaner blades 96 should be biased into sliding engagement with the peripheries of the rims 98 of the spacer discs 82. FIGS. 10, 11 and 12 show the means for thus biasing the cleaner blades 96.

As clearly seen in FIGS. 11 and 12, each stationary support rod 94 extends with clearance through a hole 100 defined centrally in each cleaner blade 96. The cleaner blade has an additional pair of holes 102 formed therein on both sides of the clearance hole 100. Closely received in these additional holes are a pair of connector rods 104 which serve to rigidly interconnect each complete set of cleaner blades 96 and which are movable therewith relative to the support rod 94. A plurality of torsion springs 106 are coiled around each support rod 94 in longitudinally spaced apart positions thereon. Each coiled torsion spring 106 has a pair of legs 108 held against the respective connector rods 104. Thus the torsion springs 106 act between the stationary support rod 94 and the set of cleaner blades 96 to bias the latter rightwardly, as viewed in FIGS. 11 and 12, so that a pair of scraping edges 110 of each cleaner blade are forced into sliding engagement with the periphery of one spacer disc 82.

The greater the force with which the cleaner blades are sprung against the spacer discs, up to a certain limit, the more thoroughly will they remove the solids from the filter cartridge. Should the spring force be unduly great, however, too much torque would be required for the revolution of the cartridge, and both cleaner blades and spacer discs would suffer rapid wear.

Experiment has proved that a spring force of 20 to 40 grams is optimum for each 0.4 millimeter thick cleaner blade. Accordingly, when 200 such cleaner blades are stacked to form each of the preferred two sets of such cleaner blades, the recommended total spring force is four kilograms at a minimum. This means that if three torsion springs 106 are to be used for each set of 200 cleaner blades, each spring should be capable of exerting a force of approximately 1.4 kilograms.

A reference back to FIG. 2 in particular will show that the core rod 88 of the cartridge filter 28 rotatably extends upwardly through the sleeve 68 of the removable casing top 32 and is connected end to end to the output shaft 112 of a rotary actuator 114 via a coupling 116. The coupling 116 is mounted within a housing 118 which is screwed at 120 to the casing top 32. The rotary actuator 114 is mounted atop the coupling housing 118 and is suitably fastened thereto as at 122.

Figure 13:
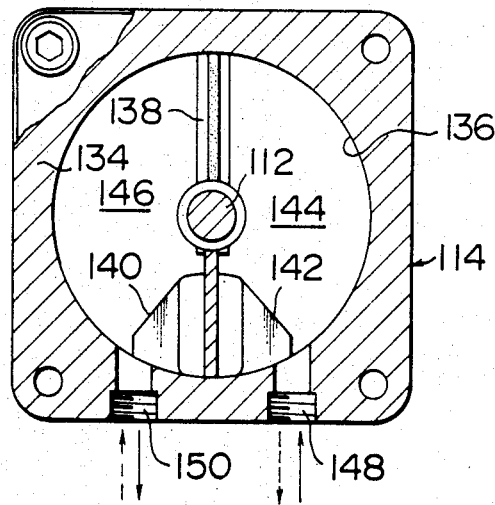
FIG. 13 is an enlarged horizontal section through the bidirectional rotary actuator in the apparatus of FIGS. 1 and 2.

A preferred form of the rotary actuator 114 for use with the two sets of cleaner blades 96 is a fluid actuated, preferably pneumatic, bidirectional rotary actuator, shown in detail in FIG. 13, capable of rotation through an angle up to 360 degrees in each direction. The angle of rotation may, for example, be 270 degrees. As the output shaft 112 of the rotary actuator 114 rotates bidirectionally, so does the stack of filter discs 80 with the interposed spacer discs 82. The two sets of cleaner blades 96 remain stationary despite such bidirectional rotation of the filter and spacer discs, so that the mostly nonmagnetic solids that have been arrested by the filter cartridge are scraped off. A major proportion of the scraped solids will settle to the concave bottom 30 of the casing 22, although small fractions of them will adhere to the opposite sides of each cleaner blade 96. A plurality of fixed guide rods 124 are secured to the removable casing top 32 and extend along the stack of filter discs 80 to hold the same against axial displacement during their bidirectional rotation.

It will also be observed from FIG. 2 that the core rod 88 of the cartridge filter 28 has a downward extension 126. This core rod extension terminates in an agitator blade 128 located adjacent the bowl shaped bottom 30 of the casing 22. Preferably, and as shown, the agitator blade 128 partly projects into the drain port 38 located centrally in the casing bottom 30. The agitator blade 128 or equivalent means may be made readily detachable from the core rod extension 126.

Thus, upon rotation of the core rod 88 by the actuator 114, not only is the cartridge filter 28 cleaned, but also the agitator blade 128 is turned bidirectionally to agitate and disperse the solids that have accumulated on the bowl shaped bottom 30 of the casing 22. The agitator blade 128 is of course intended to expedite the drainage of the liquid, together with the removed solids, through the drain port 38.

Figure 14:
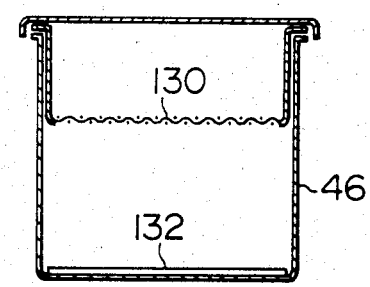
FIG. 14 is a vertical section through the drain receptacle in the apparatus of FIGS. 1 and 2.

The receptacle 46 for receiving the drain through the dock 40 is shown sectioned in FIG. 14. It has a filter net 130 disposed at a distance from its bottom for separating mostly nonmagnetic solids from the drain. A permanent magnet or magnets 132 are provided on the bottom of the drain receptacle 46 for collecting the magnetic solids that have passed the filter net 130.

With reference to FIG. 13 the exemplifying rotary actuator 114 has a casing 134 defining a cylindrical plenum 136. Rotatably mounted centrally in the plenum 136 is the shaft 112 having a vane 138 fixedly mounted thereon for bidirectional rotation therewith. A pair of limit stops 140 and 142 limit the angle of rotation of the vane 138 in both directions. The vane 138 has a free end held against the surface of the plenum 136 in slidable but practically airtight contact therewith, thus dividing the plenum into a pair of opposed air chambers 144 and 146. The casing 134 has a pair of air inlet/outlet ports 148 and 150 for the ingress and egress of air under pressure into and from the respective air chambers 144 and 146. The introduction of pressurized air into the right hand air chamber 144 through the right hand inlet/outlet port 148, as indicated by the solid arrow in FIG. 13, results in the rotation of the vane 138 in the counterclockwise direction. The vane 138 stops on hitting the left hand limit stop 140. Upon introduction of pressurized air into the left hand air chamber 146 through the left hand inlet/outlet port 150, as indicated by the dashed arrow, the vane 138 turns clockwise until it hits the right hand limit stop 142. The pressurized air is delivered alternately into the two air chamber 144 and 146. The consequent bidirectional revolution of the vane 138 is imparted via the shaft 112 to the core rod 88 of the cartridge filter 28 and, via its extension 126, to the agitator blade 128 and so is utilized both for cleaning the cartridge filter and for agitating the settled solids.

The required output torque of the rotary actuator 114 depends upon the particular design of the cartridge filter 28. For instance, when the cartridge filter has approximately 150 filter discs, each with a diameter of 58 millimeters stacked to a height of 200 millimeters, the torque requirement for cleaning this filter when it is immersed in printing ink will be approximately 0.5 kgf-m. In practice the output torque of the rotary actuator 114 may be from 0.5 to 1.0 kgf-m.

Under some operating conditions the cartridge filter 28 may clog up, or the removed solids may accumulate on the casing bottom 30, to such an excessive degree that the core rod 88 with its downward extension 126 may become nonrotatable by the maximum available output torque of the rotary actuator 114. In consideration of such emergencies the shaft 112 of the rotary actuator 114 has an upward extension 152 (FIG. 2) of polygonal cross section. The shaft extension 152 may be turned manually, as by wrenching, in the event of such emergencies.

The time intervals at which the cartridge filter 28 must be cleaned vary widely depending upon the proportion of the solids contained in the liquid being processed. It is recommended to automate the cleaning of the filter assembly, by automatically setting the rotary actuator 114 into operation whenever the flow rate of the clarified liquid downstream of the cartridge filter 28 drops to a prescribed level.

Figure 15:
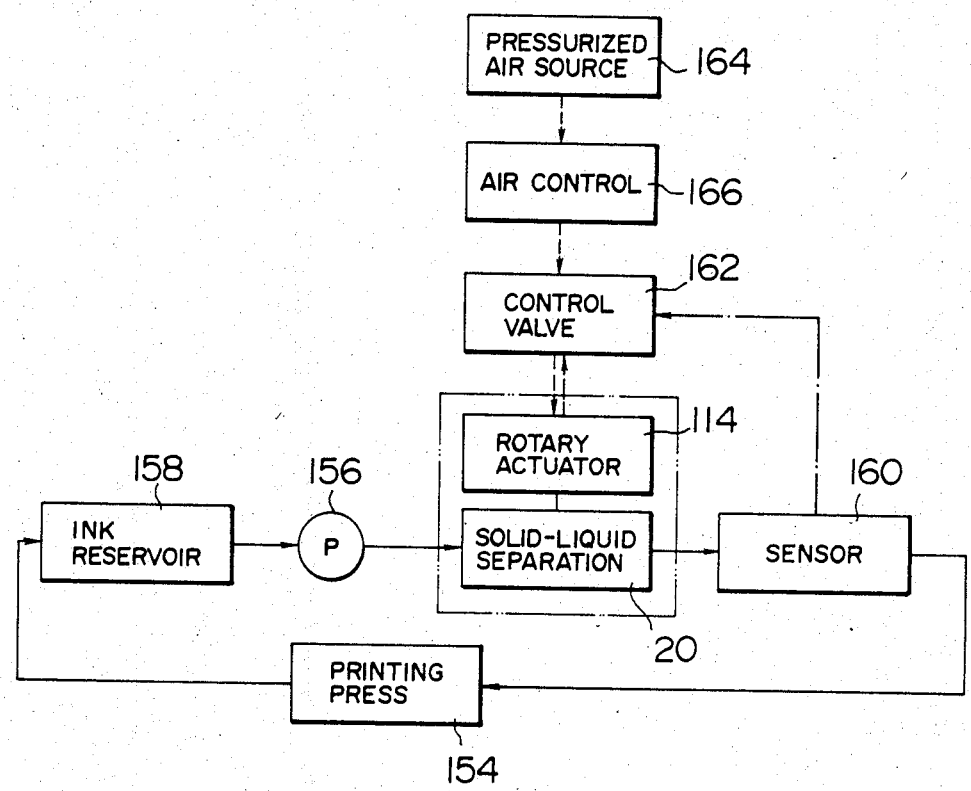
FIG. 15 is a block diagram of the system for automatically cleaning the cartridge filter at variable intervals in the apparatus of FIGS. 1 and 2.

FIG. 15 shows a preferred system for such automatic cleaning of the cartridge filter 28, or automatic reconditioning of the complete solid-liquid separation apparatus 20. The apparatus 20 is herein shown connected in circuit with a printing press 154. A pump 156 draws the printing ink from a reservoir 158 and delivers it under pressure to the solid-liquid separation apparatus 20 of FIGS. 1 and 2. The clarified printing ink is fed to the printing press 154, which consumes part of the ink. The remainder of the ink flows back to the reservoir 158.

In accordance with a feature of the invention a sensor 160 is connected downstream of the solid-liquid separation apparatus 20, as by being mounted at its outlet 36. The sensor 160 may be either a flowmeter or other class of instrument capable of ascertaining the flow rate of the clarified printing ink. The sensor 160 is required to put out a signal, preferably either electric or pneumatic, when the flow rate of the liquid drops to a predetermined minimum. The minimum flow rate is that at which the apparatus 20 requires reconditioning for the proper printing operation of the press 154. Such a value may be determined by previous experimentation.

As has been stated in conjunction with FIG. 13, the rotary actuator 114 coupled to the cartridge filter 28 has the pair of opposed air chambers 144 and 146 for alternately receiving pressurized air to cause the bidirectional rotation of the core rod 88. Thus a control valve 162 is provided between the rotary actuator 114 and a source 164 of air under pressure. Normally held closed, the control valve 162 opens in response to the output from the sensor 160 to cause alternate delivery of the pressurized air to the two air chambers 144 and 146 of the rotary actuator 114 from its source 164. Such a valve is known per se. An air control 166 interposed between pressurized air source 164 and control valve 162 controls the pressure and flow rate of the air being delivered to the rotary actuator 114 in order to correspondingly control its output torque and rotative speed. The sensor 160 may also determine the required flow rate from the pressure difference across the cartridge filter 28. Such an instrument may be mounted in the position indicated by the phantom outline in FIG. 7.

Operation

Although the operation of the solid-liquid separation apparatus 20 is believed to be largely apparent from the foregoing, further amplification will be made in the following brief summary of such operation.

The gravure printing ink to be clarified is pumped into the liquid chamber 24 in the casing 22 through its inlet 34. The velocity of the liquid decreases as it enters the liquid chamber 24 because of its greater cross sectional area than that of the flow path to the casing 22. Consequently the liquid flows down the tubular space between the major portion 48 of the casing 22 and the cartridge filter 28 concentrically mounted therein. Since the magnetic fields MF are established in this annular space by the magnet assembly 26, the magnetic solids contained in the printing ink, such as iron particles ranging in size from several microns to more than one hundred microns, are nearly wholly attached magnetically to the inside surface of the casing 22 while flowing down the liquid chamber 24 and so are separated from the ink.

Thus freed from the magnetic solids, the printing ink subsequently flows into the cartridge filter 28 through the spaces between the stack of filter discs 80. The cartridge filter removes mostly nonmagnetic solids from the printing ink. The removal of the magnetic and nonmagnetic solids from the printing ink by the apparatus 20 is so complete that no such difficulties as those pointed out previously in this specification will be encountered in the printing press 154. The clarified printing ink flows upwardly through the cartridge filter 28 and then out of the apparatus 20 through the outlet 36.

It should be appreciated that the removal of both magnetic and nonmagnetic particles from the liquid takes place in one and the same liquid chamber 24. This makes it possible to reduce the size of the apparatus 20 to an absolute minimum.

The sensor 160, (FIG. 15) activates the control valve 162 for the delivery of the pressurized air from source 164 to rotary actuator 114 when the flow rate of the clarified liquid decreases to a predetermined minimum. The minimum flow rate depends, of course, upon the machine for use with the apparatus 20 of this invention. Take, for example, a multicolor gravure printing press with a printing speed ranging from 300 to 500 revolutions per minute, to which printing ink is normally supplied at a rate of 80 liters per minute. In the use of the apparatus 20 with this printing press the minimum flow rate to be sensed by the sensor 160 may be 40 liters per minute.

When activated by the sensor 160 the control valve 162 alternately delivers the pressurized air to the pair of opposed fluid chambers 144 and 146 (FIG. 13) of the rotary actuator 114. The result is the bidirectional rotation of the core rod 88 with the stack of filter discs 80 as well as the interposed spacer discs 82. The solids that have been caught between the filter discs are combed out by the two stationary sets of cleaner blades 96 and mostly settle to the bottom 30 of the casing 22.

The cleaning ability of the cleaner blades 96 is materially enhanced by the fact that they are sprung against the peripheries of the spacer discs 82, as has been evidenced by the following experiment. The cartridge filter in use was of the aforesaid type having 200 filter discs, each with a diameter of 58 millimeters, stacked to a height of 200 millimeters. Two sets of cleaner blades were arranged in diametrically opposite positions of the cartridge filter as in the instant embodiment, but without being sprung against the spacer discs. When printing ink containing 50 grams of paper fibers was pumped through the cartridge filter, it clogged up, making impossible the flow of the ink therethrough, despite cleaning at intervals of five seconds. By way of comparison the same printing ink containing 50 grams of paper fibers was filtered by the cartridge filter having the two diametrically opposed sets of cleaner blades sprung against the spacer discs with the total force of four kilograms in accordance with the invention. The cartridge filter showed no signs of clogging when cleaned at 30 second intervals; the initial flow rate of 80 liters per minute decreased only to 70 liters per minute.

The bidirectional rotation of the core rod 88 is also imparted to the agitator blade 128 via the core rod extension 126. The bidirectional rotation of the agitator blade 128 serves to prevent the settled solids from sticking together and so clogging up the drain port 38. Such operation of the agitator blade is concurrent with the cleaning of the cartridge filter 28.

The magnet assembly 26 with its separable sheath halves 50' may be removed from the casing 22 after an appropriate period of operation. The magnetic solids that have been attached to the inside surface of the casing 22 will then fall onto its bottom 30.

All that is required for the discharge of the removed solids from within the casing 22 is to open the drain cock 40 by the manipulation of its handle 42. Both magnetic solids such as iron particles and nonmagnetic solids such as paper fibers will then readily fall into the receptacle 46 together with the printing ink within the casing 22. There will be no possibility of the solids clogging the drain port 38 as they have been agitated each time the cartridge filter 28 is cleaned.

Alternative Forms

In some applications of the invention the solids to be removed from a liquid may all be magnetic. Thus, in an alternative solid-liquid separation apparatus 20a shown in FIG. 16, no filter assembly is provided; only the magnet assembly 26 surrounds the casing 22. Provided in place of the filter assembly is a flat baffle 170 extending downwardly from the removable top 32 of the casing 22 and terminating short of its bowl shaped bottom 30. The baffle 170 functions to prevent the liquid flowing directly from inlet 34 to outlet 36. The incoming liquid first flows downwardly of the casing 22 and, on passing under the baffle 170, upwardly toward the outlet 36, as indicated by the arrows. The magnet assembly 26 attracts and removes the magnetic solids while the liquid is so flowing through the casing 22. The other details of this apparatus 20a can be substantially as set forth above in connection with the apparatus 20 of FIGS. 1 and 2.

Figure 16:
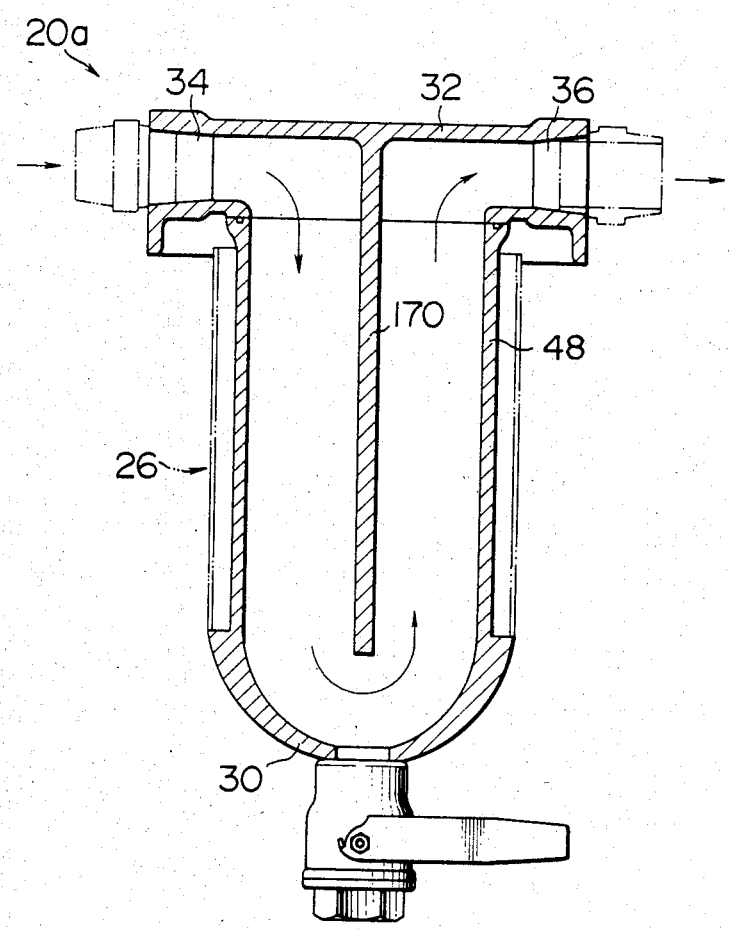
FIG. 16 is an axial section through an alternative form of the apparatus in accordance with the invention.
Figure 17:
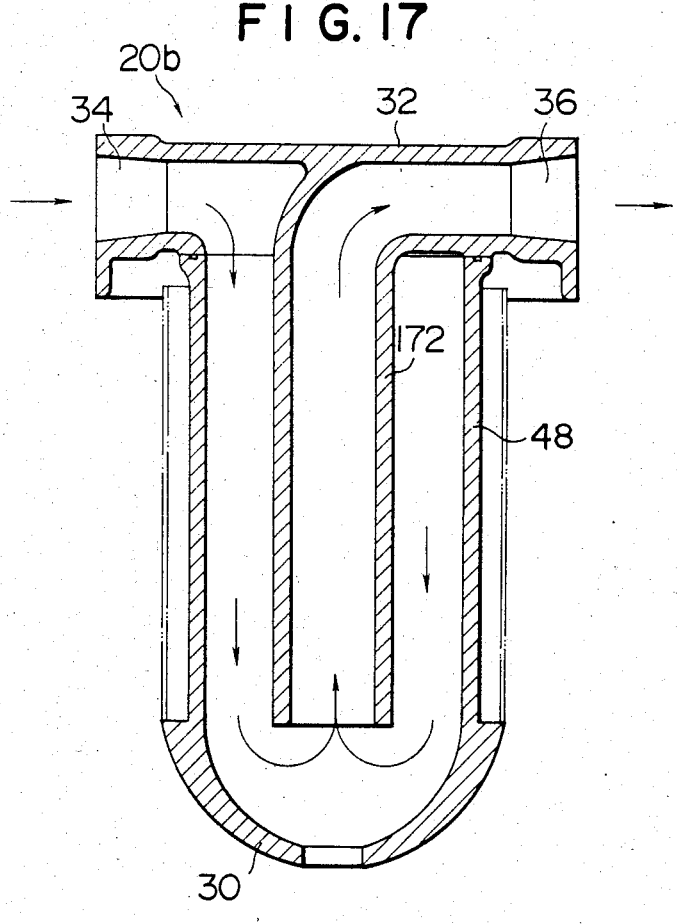
FIG. 17 is an axial section through another alternative form of the apparatus in accordance with the invention.

Another alternative solid-liquid separation apparatus 20b of FIG. 17 employs a tubular flow guide 172 in lieu of the flat baffle 170 of FIG. 16. The flow guide 172 also extends downwardly from the removable top 32 of the casing 22 and terminates short of its bowl shaped bottom 30. The upper end of the flow guide 172 is in direct communication with the outlet 36 whereas its upper end is open toward the bottom 30 of the casing. On flowing into the casing 22 through its inlet 34 the liquid first flows downwardly and then upwardly through the flow guide 172 toward the outlet 36.

Figure 18:
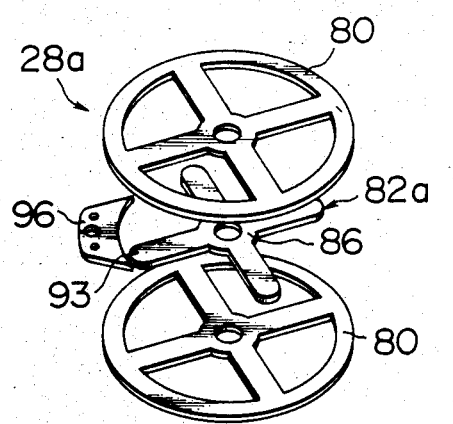
FIG. 18 is a view corresponding to FIG. 8 but showing an alternative form of the cartridge filter for use in the apparatus of FIGS. 1 and 2.
Figure 19:
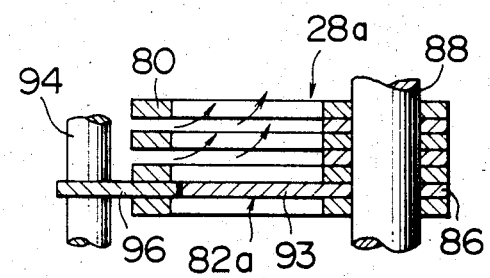
FIG. 19 is a view corresponding to FIG. 9 and showing the cartridge filter of FIG. 18.

FIGS. 18 and 19 show a modified cartridge filter 28a for use in place of the cartridge filter 28 in the apparatus 20 of FIGS. 1 and 2. The modified cartridge filter 28 differs from the cartridge filter 28 only in that each spacer 82a has only the hub 86 and spokes 93 but no rim. The filter discs 80 and cleaner blades 96 are identical with their corresponding parts of the cartridge filter 28.

In the apparatus 20c shown in FIG. 20 the core rod 88 is divided into an upper portion 174 coupled to the rotary actuator 114 via the coupling 116 and a lower portion 176 having the stack of filter discs 80 mounted thereon. The upper and lower portions of the core rod are separably coupled end to end by a coupling 178. With the core rod 88 thus divided into the two portions 174 and 176 at a point just above the cartridge filter 28, the latter will be readily replaceable as upon destruction of the filter discs by removing the top 32 from the casing 22.

It is to be understood that the present invention is not to be limited by the exact details of the above disclosed embodiments. For instance, the permanent magnets may not necessarily be displaceably mounted to the sheath but may be glued or otherwise immovably attached thereto. Further the permanent magnets themselves may be replaced by an electromagnet or electromagnets. Additional modifications will occur to the specialists within the scope of the invention.

What is claimed is:

1. An apparatus for the separation of solids from a liquid, comprising:
   (a) an upstanding cylindrical casing having an inlet for admission of a liquid to be processed and an outlet for discharge of said liquid, said inlet and said outlet being arranged at a first end of said casing, said casing having a drain port at a second end thereof;
   (b) magnet means disposed on an outer surface of and surrounding said casing, said magnet means being capable of attracting magnetic solids contained in said liquid while said liquid is flowing through said casing from said inlet to said outlet;
   (c) a generally cylindrical filter assembly mounted concentrically within said casing being capable of removing nonmagnetic solids from said liquid, said filter assembly comprising:
      (i) a core rod rotatably mounted at said first end of said casing and extending downwardly into said casing;
      (ii) a stack of apertured filter discs concentrically mounted on said core rod for rotation therewith, said filter discs being capable of trapping solids contained in said liquid;
      (iii) a plurality of stationary cleaner blades slidably engaged between said filter discs, said cleaner blades scraping said solids off said filter discs upon rotation of said filter discs, said cleaner blades being arranged in two stacks circumferentially spaced around said stack of filter discs;
      (iv) a space being forced radially inwardly of said filter discs and said cleaner blades, said space being in communication with said outlet; and
   (d) a bidirectional rotary actuator disposed at said first end of said casing, said actuator being coupled to said core rod to rotate said core rod and said filter discs relative to said cleaner blades, said actuator rotating said core rod bidirectionally through less than a 360° angle.

2. The solid-liquid separation apparatus of claim 1, wherein said core rod has an upper portion coupled to said acutator amd a lower portion having said stack of filter discs mounted thereon, said upper and said lower portions being separably coupled by a coupling.

3. The solid-liquid separation apparatus of claim 1, further comprising a sensor for sensing a flow rate of said liquid downstream of said filter assembly, and control means responsive to an output from said sensor for operating said actuator when said flow rate is below a predetermined value.

4. The solid-liquid apparatus of claim 3, wherein said rotary actuator is fluid actuated and said rotary actuator has a pair of opposed fluid chambers for alternately receiving a fluid under pressure, and wherein said control means comprises a valve for alternately supplying said pressurized fluid to said opposed fluid chambers of said actuator when activated by said output from said sensor.

5. The solid-liquid separation apparatus of claim 1, further comprising agitator means secured to a second end of said core rod, said agitator means rotating with rotation of said core rod, said agitator means being located adjacent said drain port and agitating accumulated solids at said second end of said casing concurrently with cleaning of said filter discs, thereby preventing said accumulated solids from clogging said drain port.

6. The solid-liquid separation apparatus of claim 5, wherein said agitator means comprises an agitator blade removably attached to said core rod, said agitator blade partially projecting into said drain port.

7. The solid-liquid separation apparatus of claim 5, wherein said drain port is positioned centrally in a bowl-shaped portion at said second end of said casing.

8. The solid-liquid separation apparatus of claim 1, further comprising:
   (a) a plurality of apertured spacer discs arranged alternately with said filter discs to provide a spacing between said filter discs, said spacer discs having a smaller diameter than said filter discs; and
   (b) biasing means for urging said cleaner blades into sliding engagement with a periphery of said spacer discs.

9. The solid-liquid apparatus of claim 8, wherein said biasing means comprises a support rod mounted in fixed relation to said casing and extending through a hole in each said cleaner blade, connector means rigidly interconnecting said cleaner blades, and spring means acting between said suport rod and said cleaner blades to bias said cleaner blades into sliding engagement with said periphery of said spacer discs.

10. The solid-liquid separation apparatus of claim 9, wherein said spring means comprises a plurality of torsion springs at spaced apart positions along said support rod, each said torsion spring having its opposite extremities held against said connector means.

11. An apparatus for the separation of solids from a liquid, comprising:
   (a) an upstanding cylindrical casing having an inlet for admission of a liquid to be processed and an outlet for discharge of said liquid, said inlet and said outlet being arranged at a first end of said casing, said casing having a drain port at a second end thereof;
   (b) magnet means disposed on an outer surface of and surrounding said casing, said magnet means being capable of attracting magnetic solids contained in said liquid while said liquid is flowing through said casing from said inlet to said outlet;
   (c) a generally cylindrical filter assembly mounted concentrically within said casing being capable of removing nonmagnetic solids from said liquid, said filter assembly comprising:
      (i) a core rod having a first end rotatably mounted at said first end of said casing and extending downwardly into said casing;
      (ii) a stack of apertured filter discs concentrically mounted on said core rod for rotation therewith, said filter discs being capable of trapping solids contained in said liquid;
      (iii) a plurality of stationary cleaner blades slidably engaged between said filter discs, said cleaner blades scraping said solids off said filter discs upon rotation of said filter discs;
      (iv) a space being formed radially inwardly of said filter discs and said cleaner blades, said space being in communication with said outlet;
   (d) an actuator disposed at said first end of said casing, said actuator being coupled to said core rod to rotate said core rod and said filter discs relative to said cleaner blades; and
   (e) agitator means including an agitator blade removably attached to a second end of said core rod, said agitator means rotating with rotation of said core rod, said agitator blade partially projecting into said drain port and agitating accumulated solids at said second end of said casing concurrently with cleaning of said filter discs, thereby preventing said accumulated solids from clogging said drain port.

* * * * *